(12) United States Patent
Jia et al.

(10) Patent No.: US 10,715,285 B2
(45) Date of Patent: Jul. 14, 2020

(54) SYSTEMS AND METHODS FOR PARTIAL COLLISION MULTIPLE ACCESS

(71) Applicants: Ming Jia, Ottawa (CA); Jianglei Ma, Ottawa (CA); Javad Abdoli, Ottawa (CA)

(72) Inventors: Ming Jia, Ottawa (CA); Jianglei Ma, Ottawa (CA); Javad Abdoli, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/222,733

(22) Filed: Dec. 17, 2018

(65) Prior Publication Data

US 2019/0123865 A1 Apr. 25, 2019

Related U.S. Application Data

(63) Continuation of application No. 15/167,477, filed on May 27, 2016, now Pat. No. 10,158,458.
(Continued)

(51) Int. Cl.
*H04L 5/00* (2006.01)
*H04B 1/707* (2011.01)
(Continued)

(52) U.S. Cl.
CPC ........... *H04L 5/0007* (2013.01); *H04B 1/707* (2013.01); *H04B 1/71072* (2013.01);
(Continued)

(58) Field of Classification Search
CPC ... H04J 11/0026; H04J 11/004; H04B 7/0413; H04B 1/707; H04B 1/71072; H04B 2201/709709; H04L 5/0007; H04L 5/0026
See application file for complete search history.

(56) References Cited

U.S. PATENT DOCUMENTS 7,689,178 B2 3/2010 Parkvall et al.
9,166,663 B2 10/2015 Bayesteh et al.
(Continued)

FOREIGN PATENT DOCUMENTS

CN 101692664 4/2010
CN 102273158 12/2011
(Continued)

OTHER PUBLICATIONS

Taherzadeh, Mahmoud, et al., "SCMA Codebook Design", Vehicular Technology Conference (VTC2014-Fall), 2014 IEEE 80th, Sep. 14-17, 2014, pp. 1-5.
(Continued)

*Primary Examiner* — Brian D Nguyen

(57) ABSTRACT

Methods, devices and systems for encoding and transmitting data in a wireless communications system and, in particular, for unscheduled data transmissions including low data rate transmissions. The method for transmitting data in a wireless network includes mapping data according to a predefined sequence pattern from a group of sequence patterns to provide a spreading sequence that includes multiple non-zero elements and that is enabled to partially collide in the wireless network with other spreading sequences that have been mapped according to other sequence patterns from the group; and transmitting the spreading sequence. Multiple sequences may be received by a network node and decoded using successive interference cancellation (SIC) techniques.

20 Claims, 9 Drawing Sheets

Related U.S. Application Data

(60) Provisional application No. 62/168,437, filed on May 29, 2015.

(51) Int. Cl.
H04B 1/7107 (2011.01)
H04B 7/0413 (2017.01)
H04J 11/00 (2006.01)

(52) U.S. Cl.
CPC .......... *H04B 7/0413* (2013.01); *H04J 11/004* (2013.01); *H04J 11/0026* (2013.01); *H04L 5/0026* (2013.01); *H04B 2201/709709* (2013.01)

(56) References Cited

U.S. PATENT DOCUMENTS

| | | | |
|---|---|---|---|
| 9,240,853 B2 | 1/2016 | Nikopour et al. | |
| 9,356,748 B2 | 5/2016 | Nikopour et al. | |
| 9,509,379 B2 | 11/2016 | Taherzadeh Boroujeni et al. | |
| 2002/0191682 A1 | 12/2002 | Moon | |
| 2006/0056360 A1 | 3/2006 | Parkvall et al. | |
| 2007/0081604 A1 | 4/2007 | Khan et al. | |
| 2009/0022207 A1 | 1/2009 | Brethour et al. | |
| 2010/0122143 A1 | 5/2010 | Lee et al. | |
| 2010/0290505 A1 | 11/2010 | Nagano et al. | |
| 2010/0292505 A1 | 11/2010 | Leveque et al. | |
| 2011/0243191 A1 | 10/2011 | Nakao et al. | |
| 2012/0201275 A1* | 8/2012 | Tiirola | H04J 13/0062 375/135 |
| 2013/0216231 A1 | 8/2013 | Yang et al. | |
| 2013/0286975 A1* | 10/2013 | Nakao | H04J 11/005 370/329 |
| 2014/0140360 A1 | 5/2014 | Nikopour et al. | |
| 2014/0169408 A1 | 6/2014 | Bayesteh et al. | |
| 2014/0185561 A1* | 7/2014 | Nakao | H04J 11/005 370/329 |
| 2014/0204982 A1* | 7/2014 | Seibert | H04B 1/707 375/144 |
| 2014/0233494 A1 | 8/2014 | Sorrentino | |
| 2014/0362843 A1 | 12/2014 | Cai et al. | |
| 2014/0369434 A1 | 12/2014 | Taherzadehboroujeni et al. | |
| 2015/0029981 A1 | 1/2015 | Takahashi et al. | |
| 2015/0043520 A1* | 2/2015 | Sun | H04L 5/001 370/330 |
| 2015/0043540 A1 | 2/2015 | Nikopour et al. | |
| 2015/0236775 A1 | 8/2015 | Lee et al. | |
| 2016/0204920 A1* | 7/2016 | Benjebbour | H04W 16/28 370/329 |

FOREIGN PATENT DOCUMENTS

| | | |
|---|---|---|
| CN | 102549995 A | 7/2012 |
| CN | 103346993 | 10/2013 |
| CN | 104320234 | 1/2015 |
| CN | 105432034 A | 3/2016 |
| EP | 2467985 B1 | 3/2016 |
| JP | 2014140256 | 7/2014 |
| WO | WO 2012140847 | 10/2012 |

OTHER PUBLICATIONS

Abstract of US 2010254484; Oct. 7, 2010; Corresponding to JP2014140256.
Abstract of US 2015195840; Jul. 9, 2015; Corresponding to CN104320234.
Abstract of US20100165829; Jul. 1, 2010; Corresponding to CN102273158.
Abstract of CN103346993; Oct 9, 2013.
Abstract of CN101692664; Apr. 7, 2010.
Abstract of US2007081604; Apr. 12, 2007.
Abstract of US2013216231; Aug. 22, 2013.
International Search Report and Written Opinion; PCT/CN2016/083808; dated Aug. 22, 2016.
International Search Report and Written Opinion; PCT/CN2016/083487; dated Aug. 29, 2016.
Overview of non-orthogonal multiple access for 5G dated Apr. 11-15, 2016.
Discussion on multiple access for new radio interface dated Apr. 11-15, 2016.
Multiple access schemes for new radio interface dated Apr. 11-15, 2016.
Considerations on DL/UL multiple access for NR dated Apr. 11-15, 2016.
Initial views and evaluation results on non-orthogonal multiple access for NR uplink dated Apr. 11-15, 2016.
Candidate Solution for New Multiple Access dated Apr. 11-15, 2016.
Candidate NR Multiple Access Schemes dated Apr. 11-15, 2016.
Non-orthogonal Multiple access candidate for NR dated May 23-27, 2016.
Initial LLS results for UL non-orthogonal multiple access dated May 23-27, 2016.
Low code rate and signature based multiple access scheme for New Radio dated May 23-27, 2016.
Non-orthogonal multiple access for New Radio dated May 23-27, 2016.
Performance of Interleave Division Multiple Access (IDMA) in Combination with OFDM Family Waveforms dated May 23-27, 2016.
New uplink non-orthogonal multiple access schemes for NR dated Aug. 22-26, 2016.
ZTE,"Uplink Multi-user Transmission for Massive MTC",3GPP TSG RAN Meeting #70 RP-152208,Sitges, Spain, 7th Dec. 10, 2015,total 8 pages.
Shutian Zhang et al.,"Design and analysis of irregular sparse code multiple access",2015 International Conference on Wireless Communications and Signal Processing (WCSP) ,total 5 pages.

\* cited by examiner

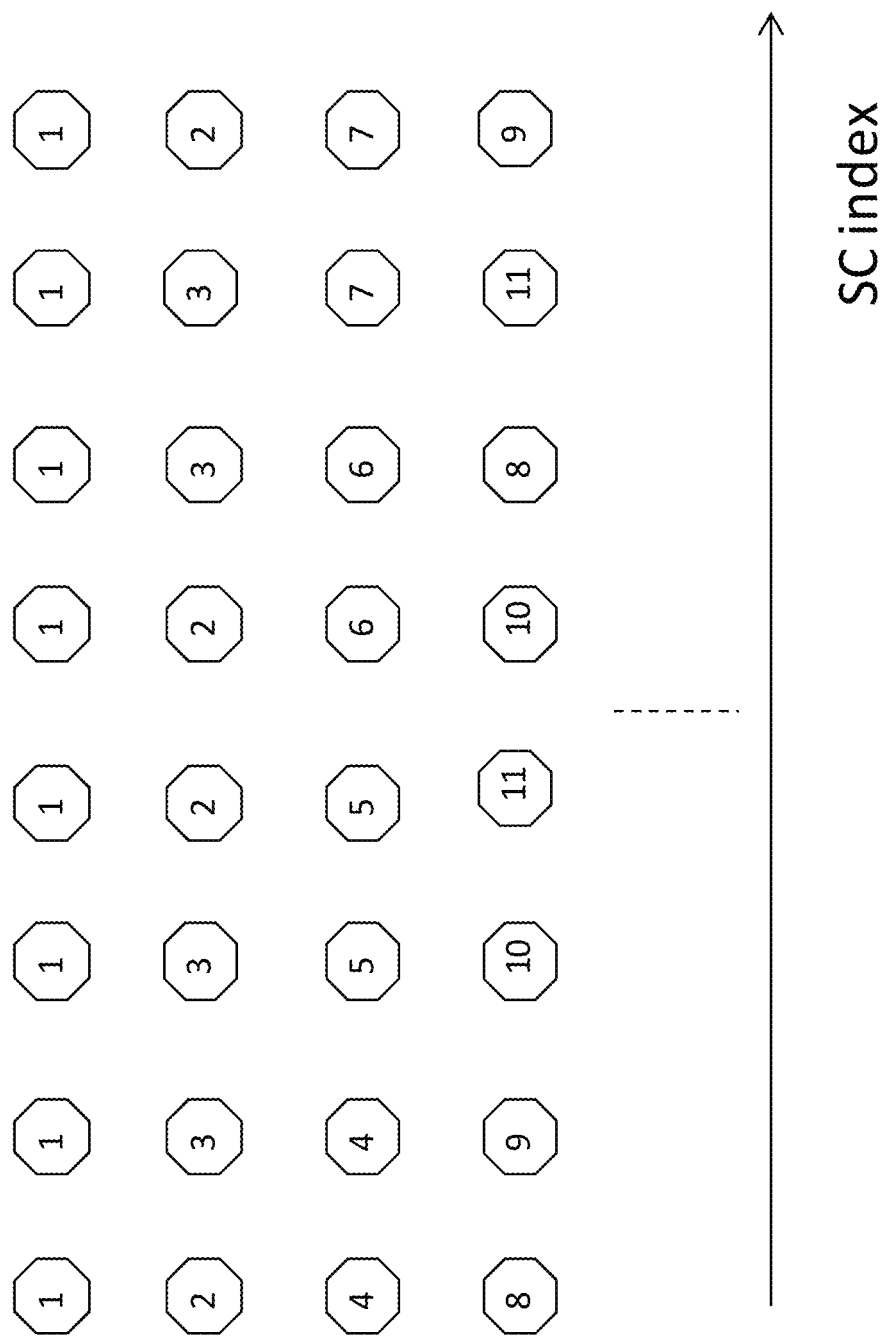

SC index

SYSTEMS AND METHODS FOR PARTIAL COLLISION MULTIPLE ACCESS

CROSS REFERENCE TO RELATED APPLICATIONS

This application is a continuation of U.S. patent application Ser. No. 15/167,477 filed May 27, 2016, issued as U.S. patent Ser. No. 10/158,458 on Dec. 18, 2018, the contents of which are incorporated herein by reference, and claims the benefit of priority from U.S. provisional patent application No. 62/168,437 entitled "Systems and Methods for Partial Collision Multiple Access" filed May 29, 2015, the contents of which are incorporated herein by reference.

TECHNICAL FIELD

The present application relates to wireless communications, and specifically, methods and systems for transmitting and receiving data for multiple devices in a network.

BACKGROUND

Data transmissions in a wireless communications system may be scheduled with transmissions from multiple user devices to a network node. This may be achieved through the exchange of control messages to schedule the transmissions over shared resources in the network. Data transmissions also may be unscheduled in order to reduce latency and overhead. Different data encoding techniques, such as Sparse Code Multiple Access (SCMA), have been proposed as improvements over traditional methods e.g. Code Division Multiple Access (CDMA). In SCMA systems, binary data streams are encoded directly to multi-dimensional codewords to spread data over multiple resource elements. Sparse codewords may be used for scheduled or unscheduled transmissions and may be decoded using message passing algorithms (MPAs).

SUMMARY

Aspects are described in this document relating to methods, devices and systems for encoding and transmitting data in a wireless communications system that may in some embodiments be applied to unscheduled data transmissions including low data rate transmissions. In one aspect, a method for transmitting data in a wireless network includes mapping data according to a predefined sequence pattern from a group of sequence patterns to provide a spreading sequence that includes multiple non-zero elements and that is enabled to partially collide in the wireless network with other spreading sequences that have been mapped according to other sequence patterns from the group; and transmitting the spreading sequence.

In some examples, the group of sequence patterns is assigned to a network node and defined such that a transmitted spreading sequence mapped according to the sequence pattern will at most partially collide with a spreading sequence mapped according to a further sequence pattern from the group. In some configurations, the group of sequence patterns is stored at a device from which the spreading sequence is transmitted. In some configurations, the predefined sequence pattern is configured to provide one or more of the non-zero elements with a pulse that is offset in the time domain relative to one or more non-zero elements that use the same resource elements in the other spreading sequences. In some examples, the predefined sequence pattern is configured to provide one or more of the non-zero elements with value that is orthogonal relative to values of one or more non-zero elements that use the same resource elements in the other spreading sequences.

In some examples, each of the spreading sequences includes the same set of subcarriers, the non-zero elements being subcarriers from the set. The spreading sequence may comprise resource elements for transmission in one of a multiple-input-multiple-output (MIMO), Orthogonal Frequency-Division Multiplexing (OFDM), or time division multiple access (TDMA) network. In some configurations, mapping data includes modulating the data to provide a first set of non-zero elements and then spreading the non-zero elements to a larger set of resource elements according to the predefined sequence pattern.

According to another example aspect is a transmitter device comprising a wireless communications interface, a processor system, and one or more non-transitory computer readable media collectively storing: a group of sequence patterns that each identify, among a set of resource elements, a subset of elements as non-zero elements; and computer readable instructions. The processor system is configured by the computer readable instructions to: map data according to a predefined sequence pattern from the group of sequence patterns to provide a spreading sequence that includes multiple non-zero elements and that is enabled to partially collide in the wireless network with other spreading sequences that have been mapped according to other sequence patterns from the group; and transmit the spreading sequence in the wireless network. In some configurations, at least some of the sequence patterns define spreading sequences that will have at least one resource element that will collide with a resource element in a further spreading sequence that has been mapped according to a further sequence pattern from the group.

According to another example aspect is a method for decoding data from a plurality of devices that transmit data to a network over a wireless interface. The method includes receiving sequences through the wireless interface from a plurality of transmitting devices, the sequences each being mapped according to a sequence pattern selected from a group of sequence patterns. The method also includes decoding the received sequences based on the group of sequence patterns. The sequence patterns define, for each of the sequences, a sub-set of resource elements used by the sequence as non-zero elements, wherein the sequence patterns define the non-zero elements so that at least some of the sequences will have some non-zero elements that collide with non-zero elements in at least one other sequence and no two sequences will have all the non-zero elements in one of the two sequences collide with all of the non-zero elements in the other of the two sequences.

In some configurations, decoding the received sequences comprises applying successive interference cancellation (SIC) to at least some of the received sequences. In some examples the method includes determining network loading, wherein decoding the received sequences comprises selectively using a successive interference cancellation (SIC) algorithm or a multiple pass algorithm (MPA) to decode the received sequences based on the determined network loading.

According to example aspects, there is provided a network element that includes a wireless communications interface, a processor system, and digital storage comprising one or more non-transitory computer readable media having stored thereon: computer readable instructions; and a group of sequence patterns that each identify, among a set of resource elements, a subset of elements as non-zero elements, the group of sequence patterns being configured such that when data is mapped to a sequence according to a sequence pattern from the group, the sequence will be enabled to partially collide with other sequences that have been mapped according to other sequence patterns from the group. The processor system is configured by the computer readable instructions to: decode, based on the stored group of sequence patterns, a plurality of partially colliding sequences received through the wireless communications interface. In some configurations, the sequence patterns define a plurality of sequences that each have a unique set of subcarriers designated as non-zero elements such that within the plurality of sequences no two sequences will have an identical set of subcarriers designated as non-zero elements but at least some of the sequences within the plurality of sequences will have one or more common subcarriers designated as non-zero elements. In some examples, the sequence patterns also define at least a first sequence having subcarriers designated as non-zero elements that are also all designated as non-zero elements in a second sequence, the sequence pattern defining a partial pulse offset in the time domain sufficient to permit the processor system to differentiate sufficiently between the subcarriers of the first and second sequences. In some examples the processor system is configured to determine network loading and decode the received sequences selectively using a successive interference cancellation (SIC) algorithm or a multiple pass algorithm (MPA) based on the determined network loading.

BRIEF DESCRIPTION OF THE DRAWINGS

Reference will now be made, by way of example, to the accompanying figures which show example embodiments of the present application, and in which:

FIG. 5B is a diagram illustrating a second sample set of partial collision sequences in accordance with one implementation of the present disclosure;

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

Unscheduled data transmissions may be beneficial for supporting communications for particular devices or applications in a wireless network such as, but not limited to, machine type communication (MTC). MTC may occur as part of the "Internet of things". A low data rate may be acceptable or mandated by the use of less complex or costly data transmitters, receivers and power units. Where a communication from a machine to a network includes a status update, sensor reading, alarm or the like, the requirement for a high data rate is less likely. Such transmissions may comprise large numbers of communications of relatively small packet size and may require a relatively low data rate. Similar characteristics may occur for downlink transmissions from the network to the device or machine. Scheduling these types of transmissions may be inefficient due to the signalling overhead incurred for small packet transmissions, the latency of a scheduling request and grant procedure, and the power consumption incurred by a transmitting device or network node to handle this overhead and delay. Although other encoding and grant-free transmission schemes have been proposed to support unscheduled transmissions, these still may require the use of more complex decoding algorithms, such as a message passing algorithm (MPA). For example, Sparse Code Multiple Access (SCMA), which employs low density codebooks to modulate data from different user devices, has been proposed for massive machine communications. SCMA can avoid multi-user collisions, however a multi iteration MPA receiver is required to detect and decode the data based on the SCMA codebook.

The present disclosure describes methods, devices and systems for encoding and transmitting data in a wireless communications system and, in particular, for unscheduled data transmissions. Complementary receiving and decoding methods, devices and systems are also illustrated along with methods for generating an encoding sequence. In some embodiments, a simple and efficient use of wireless communication resources for multiple devices is thus provided.

Figure 1:
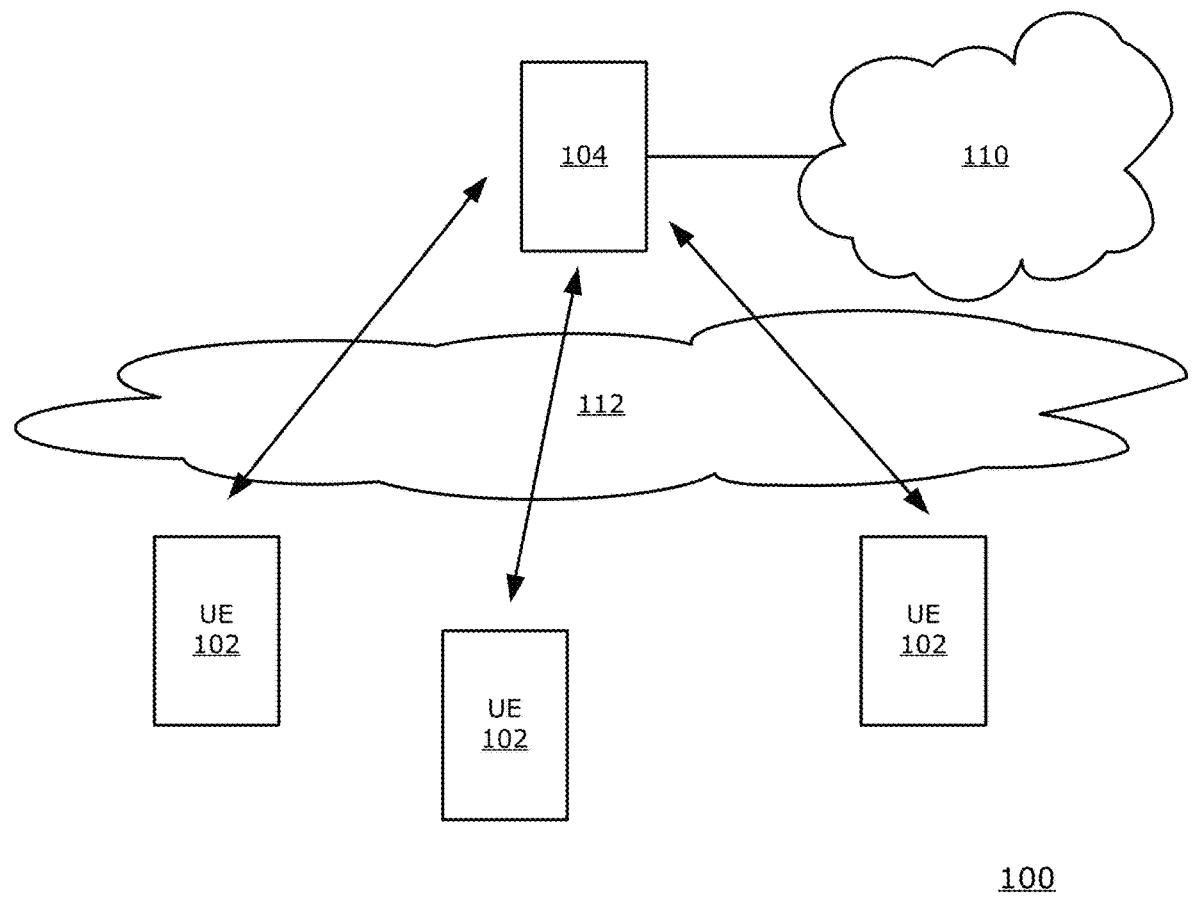
FIG. 1 is a block diagram of a communications network.

FIG. 1 illustrates a communications network 100 comprising a plurality of user devices 102 and a network element such as a network node 104. User devices 102 exchange data through a wireless communication channel or network 112. The network 100 may operate according to one or more communications or data standards or technologies including but not limited to fifth generation (5G) or fourth generation (4G) telecommunications networks, Long-Term Evolution (LTE), 3rd Generation Partnership Project (3GPP), Universal Mobile Telecommunications System (UMTS) and other wireless or mobile communications networks. The user device 102 is generally any device capable of providing wireless communications such as a user equipment (UE), wireless transmit/receive unit (WTRU), mobile station (MS), smartphone, cellular telephone, sensor, or other wireless enabled computing or mobile device. In some embodiments, the user device 102 comprises a machine which performs other primary functions and has the capability to send, receive, or send and receive data in the communications network 100, which also includes machine type communication. In one embodiment, a machine includes an apparatus or device with means to transmit and/or receive data through the communications network 100 but such apparatus or device is not typically operated by a user for the primary purpose of communications. It will be appreciated that the systems and methods described herein also may be applied to other low data rate transmission scenarios or applications and devices operating with unscheduled data transmissions. The network node 104 may comprise a base station (BS), evolved Node B (eNB), access point (AP), or other network interface which functions as a transmission and/or reception point for user devices 102 in the network 100. The network node 104 is connected to a backhaul network 110 which enables data to be exchanged between the network node 104 and other remote networks, nodes and devices (not shown).

Figure 2:
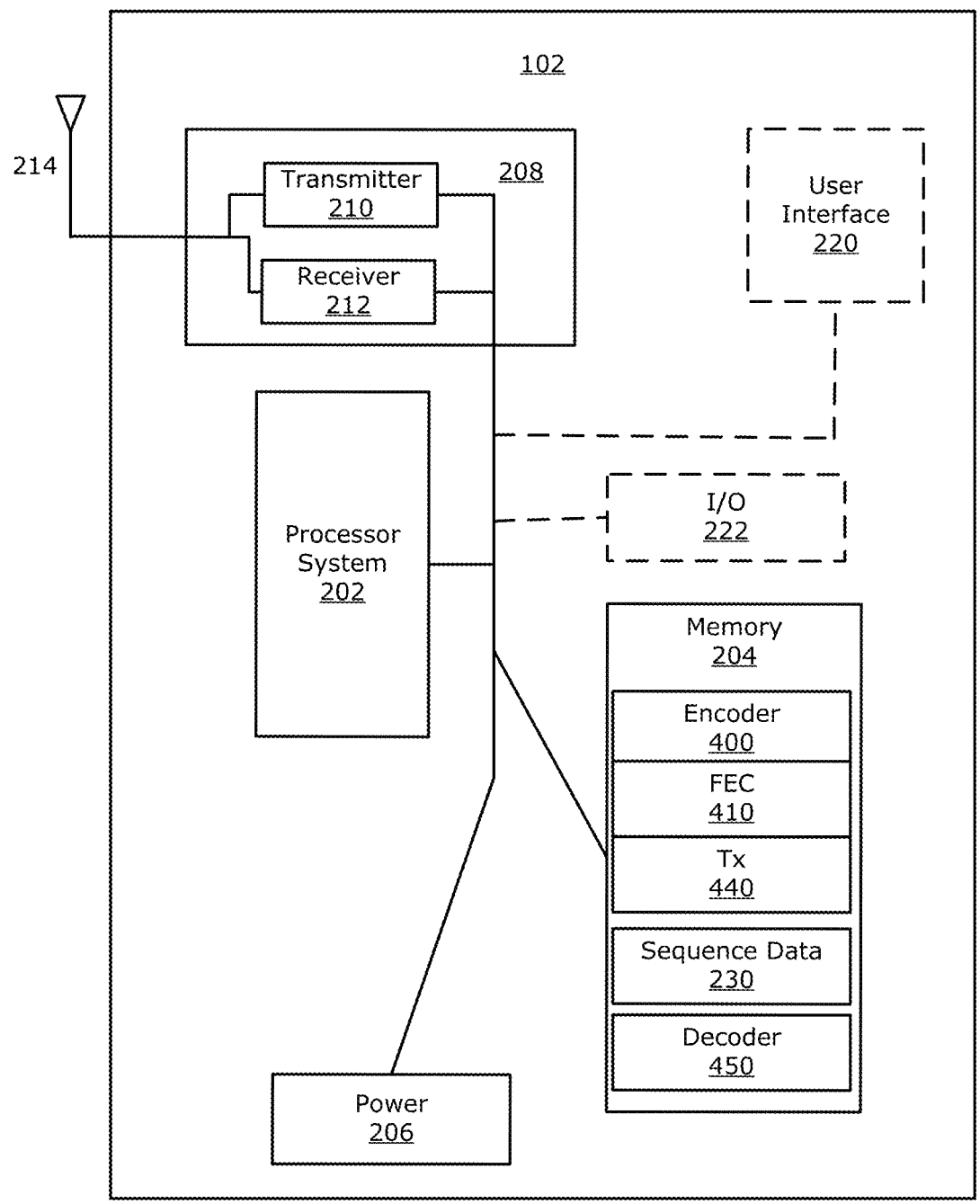
FIG. 2 is a block diagram of a user device.

FIG. 2 shows one embodiment of a device 102 for implementing the methods and modules described herein. The device 102 may include a processor system 202, a memory 204, a power unit 206 and a wireless communications interface 208 for sending and receiving data in the communications network 100, which components may or may not be arranged as shown in FIG. 2. The wireless communications interface 208 includes a transmitter 210 and a receiver 212 both coupled to an antenna 214. It will be appreciated that the functions of the wireless communications interface 208 may be carried out by different transceiver or modem components including multiple transmitter, receiver, digital signal processor (DSP) and antenna components or arrays. In one embodiment, the user device 102 includes a user interface 220 and various inputs/outputs (I/O) 222 such as a display, audio input, audio output, keypads, buttons, microphones or other inputs or outputs. The memory 204 may include both transient and non-transient storage elements that store programming and/or instructions for the processor system 202 including instructions for sending, receiving, processing and supporting different services and types of data, such as but not limited to video, VoIP calls, web browsing data, email and other text communications.

In example embodiments, a non-transient storage element of memory 204 stores computer instructions that enable the processor system 202 and device 102 to carry out the functions described herein, including for example computer instructions that enable an encoder module 400, forward error correction module 410, transmit module 440 and decoder module 450 as described in greater detail below. Processor system 202 may include one or more central processor units or digital signal processors, including for example a main central processor unit for the device 102 as well as processors used for controlling specific elements such as communications interface 208.

In example embodiments, the non-transient storage element of memory 204 stores sequence data 230 that identifies one or more predefined sets of time/frequency sequence patterns for sequences that can be transmitted by the device 102 in the wireless network 112.

Figure 3:
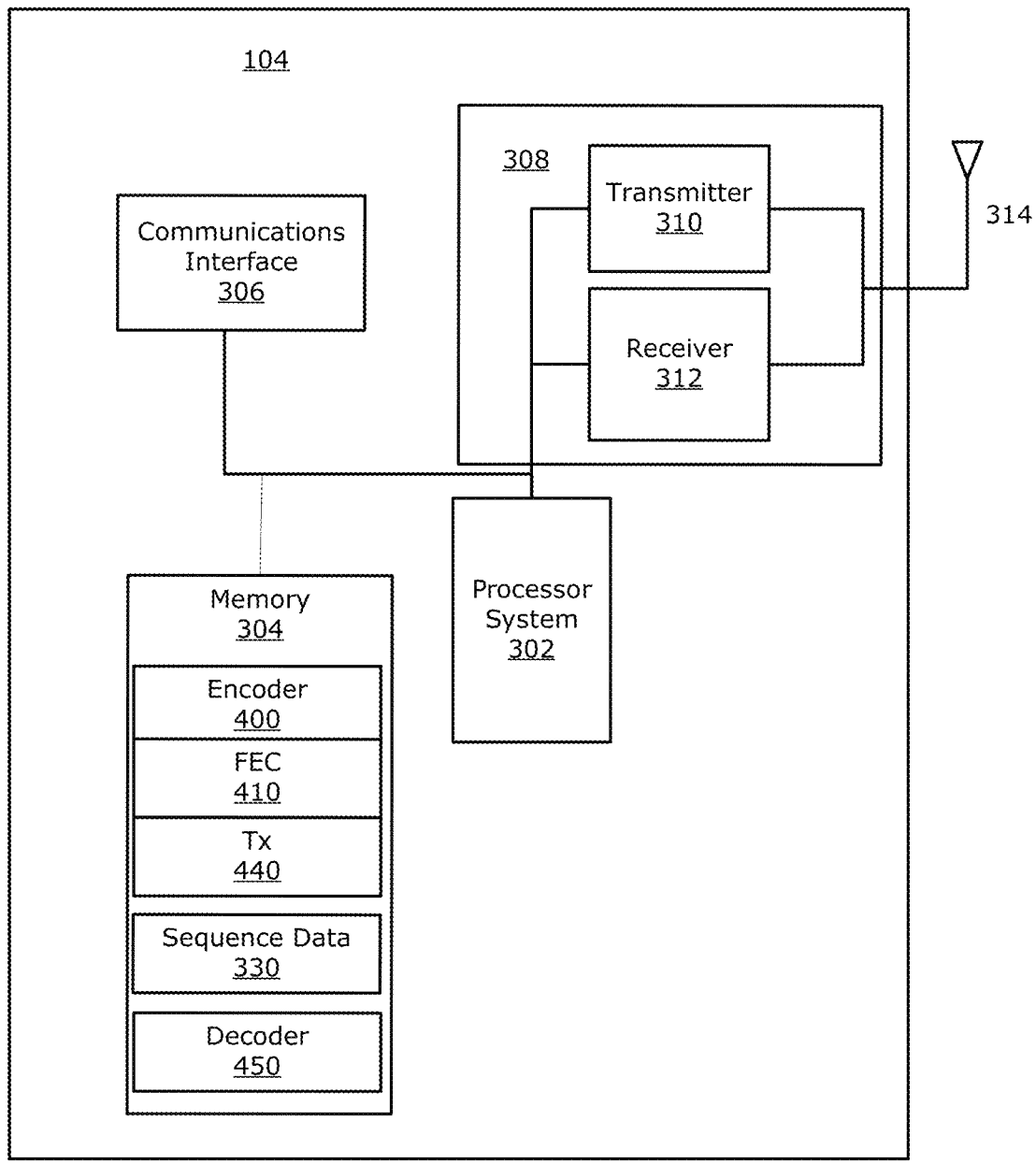
FIG. 3 is a block diagram of a network node.

FIG. 3 illustrates a network node 104 according to an embodiment of the present application. The network node 104 may comprise a processor system 302, a memory 304, one or more communications interfaces 306, 308. The communications interface 306 may be a wired or wireless interface for sending and receiving data to the backhaul network 110 or to other network nodes, gateways or relays (not shown) in the network 100. The wireless communications interface 308 is configured to send and receive data with one or more user devices 102 according to the multiple access system described herein. It will be appreciated that the functions of the wireless communications interface 308 may be carried out by different transceiver or modem components including multiple transmitter, receiver and antenna components or arrays. The memory 304 may include both transient and non-transient storage elements that store programming and/or instructions for the processor system 302 including instructions for sending and receiving data to and from a user device 102. The network node 104 may be configured to schedule data transmissions among the user devices 102 or it may be configured to support unscheduled data transmissions.

Similar to user device 102, in example embodiments, a non-transient storage element of memory 304 stores computer instructions that enable the processor system 302 and node 104 to carry out the functions described herein, including for example computer instructions that enable an encoder module 400, forward error correction module 410, transmit module 440 and decoder module 450 as described in greater detail below. Processor system 302 may include one or more central processor units or digital signal processors, including for example a main central processor unit for the node 104 as well as processors used for controlling specific elements such as communications interface 306.

In example embodiments, the non-transient storage element of memory 304 also stores sequence data 330. The sequence data 330 stored at node 104 may in some examples include a larger number or group of sequence patterns than is contained in the sequence data 230 stored on individual user devices 102. For example, the node sequence data 330 may include all the sequence patterns that are used by all of the user devices 102 supported by the node 104, whereas the sequence data 230 stored on each user device 102 may be limited to only a specific sequence pattern or sub-set of sequence patterns that will be used by the specific user device 102.

In at least some example embodiments, network node 104 is a virtualized network node that includes multiple physical network nodes 104 that collectively implement the virtualized node.

The sequence patterns that are identified in sequence data 230, 330 each define a set of resource elements in the wireless network 112 that can be applied to data to output a corresponding sequence for wireless transmission. In an example embodiment each resource element represents a time/frequency resource within the wireless network, including, for example, a subcarrier (SC). Each sequence pattern defines which of the resource elements within the sequence will be modulated to function as non-zero elements and which of the resource elements will not be modulated and hence be a zero element or benign element.

In example embodiments, the sequence patterns are part of a predetermined group of sequence patterns that have been selected to enable partial collisions among sequences that belong to a corresponding partial collision enabled sequence (PCES) group. Sequences that belong to a PCES group are referred to herein as PC (PC) sequences. PC sequences are enabled to partially collide with other PC sequences from the PCES group in that the PC sequences are designed such that: (a) no two PC sequences will have all the non-zero elements in one of the PC sequences completely collide with all of the non-zero elements in the other PC sequence; and (b) partial collisions between any two PC sequences can occur in that any two PC sequences can be successfully decoded even when they have some non-zero elements that collide with each other during transmission.

In at least some examples, each sequence pattern identifies $N_{SC}$ subcarriers (SC) that can be selectively modulated with a value or data symbol to output a PC sequence S. In various configurations, data symbols can be modulated onto a subcarrier SC using any number of possible modulation schemes, including for example QAM constellation or other suitable constellation—based modulation schemes.

Accordingly, in one embodiment, unscheduled data transmissions from the user devices 102 to the network node 104 are supported by a Partial Collision Multiple Access (PCMA) transmission scheme in the network 100. In one embodiment of the PCMA scheme, the sequence patterns that are defined in the sequence data 230, 330 can be applied to data to generate spreading sequences that are partial collision (PC) sequences. A PC sequence, when transmitted by a user device 102, will at most only partially collide with a further PC sequence that is being sent concurrently from a different user device 102 within a common or overlapping geographic coverage region. In this regard, a non-zero element collision will occur when multiple user devices 102 transmit a non-zero element using the same or overlapping resource elements, for example when a non-zero element is transmitted on the same subcarrier at the same time from multiple sources within a geographic region.

As noted above, a PCES group is designed to avoid a full or complete sequence collision, which is what would happen occur if all of the non-zero elements in a sequence transmitted from a user device 102 collided with non-zero elements from a sequence transmitted by another user device. In contrast, a partial sequence collision occurs when some, but not all, of the non-zero elements in a sequence transmitted from the user device 102 collide with non-zero elements in a sequence transmitted by another user device. Accordingly, in example embodiments PC sequences are assigned to user devices 102 and node 104 to accommodate partial sequence collision transmissions and no collision transmissions, but avoid full or complete sequence collision transmissions. Such a configuration can allow successful transmission and decoding of sequences both when no collisions occur and when partial collisions occur and thus may facilitate efficient use of one or both of network and user device resources. In one embodiment, some, or even all of the PC sequences in sequence data sets 230, 330 may have the same number of non-zero elements.

Accordingly, in an example where the number of non-zero elements in a sequence is two, the set of partial collision (PC) sequences assigned to a PCES group of devices 102 and supporting node 104 are defined such that the non-zero resource elements in a particular sequence collide with no more than one non-zero resource element from each of the other sequences. Stated differently, in an example where the total non-zero elements is two, each non-zero element in a sequence may collide with at most one non-zero element from each of the other sequences, but those other non-zero elements will each originate from a different one of the PC sequences.

In some embodiments, the PC sequences in a PCES group are defined with some sequences having a different number of non-zero elements than other sequences. The sequences with different numbers of non-zero elements have a different effective spreading factor. In various embodiments, some sequences may collide at more than one non-zero resource element. For example, a longer sequence may collide with a shorter sequence at more than one non-zero resource element. Accordingly, within a set of sequences, a particular sequence may have a greater risk of non-zero element collisions with the other sequences. As will be described in further detail below, in order to reduce the risk of collisions, sequence selection and assignment is performed to minimize the occurrence of maximum non-zero element collisions in the frequency domain. Such a selection may be accomplished by defining partially offset time domain pulses that correspond to the non-zero elements that would otherwise collide.

In an example embodiment each user device 102 is configured to transmit data by modulating and spreading the data in accordance with predefined constellation maps and PC sequence pattern from the sequence data 230 stored on the device 102. In some examples the sequence data 230 on a user device 102 only includes a single assigned PC sequence pattern that is unique to the user device 102 from the perspective of the node 104. The PC sequences S may be pre-assigned to a group of devices 102 in the network 100 by the network node 104 or by another management or scheduling entity such as a network controller (not shown) in the network 100. The assignment of sequences to user devices 102 may occur through dynamic or semi-static signalling. In example embodiments, the PC sequence or PC sequence sets may be provisioned on a device 102 and/or node 104 during a manufacturing stage or pre-delivery configuration stage as sequence patterns or sets of sequence patters stored in memory 204, 304. The device 102 may be assigned a PC sequence or a PC sequence set by the node 104 at an initiation stage or at a trigger event. The device 102 may also choose a PC sequence or a PC sequence set based on predefined criteria which may be shared with the node 104. The device 102 may or may not need to notify the node 104 about the chosen PC sequence or a PC sequence set. In some examples, a device 102 may be assigned a PC sequence or PC sequence set by node 104 when the device 102 is first activated within a wireless network. In some embodiments the device 102 may be assigned a PC sequence or PC sequence set by node 104 when a network ID is established for the device 102. In example embodiments, the PC sequences are assigned such that at any given time any sequence collisions that occur among unscheduled transmissions to or from the group of user devices 102 supported by a node 104 will at most be partial sequence collisions. Each device 102 uses its assigned PC sequence or PC sequences to access the network 100 and transmit data to the network node 104 The sequence patterns for all assigned sequences of a PCES group supported by a network node 104 are stored in the node sequence data 330 and thus are known to the network node 104 and used to decode the received data. In this regard, the network node includes computer instructions for implementing a decoder module 450. In one embodiment, a complementary allocation and use of PC sequences occurs for the transmission of data from the network node 104 to the devices 102, such that each of the devices 102 are also configured with a decoder module 240 and the node 104 is configured with an encoder module 400.

Figure 4:
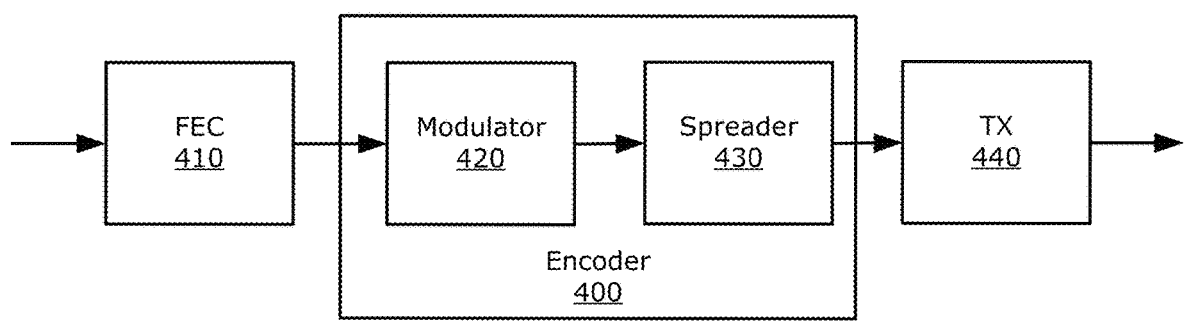
FIG. 4 is a block diagram illustrating an encoder in accordance with one implementation of the present disclosure.

FIG. 4 illustrates a block diagram of modules implemented by the processor system 202, 203 of a user device 102 or a network node 104, respectively, to encode and transmit data using PC sequences. In one example embodiment, the encoder module 400 is configured to receive an encoded binary data input and output a PC sequence S in which the binary data has been mapped to a subset of resource elements designated for use as non-zero elements. In this regard, in example embodiments the encoder module 400 provides two levels of encoding and spreading of data that are respectively implemented by a modulator function 420 and a spreader function 430. In one embodiment, an encoded binary data stream is received by the encoder 400 for transmission, such as a data stream from a forward error correction (FEC) encoder 410. A first level of spreading occurs in the modulator function 420 wherein data is encoded and spread to a size M. In particular, the modulator 420 converts the binary data into data symbols modulated onto a plurality (M) of data elements. The number (M) of data elements is equal to the number of non-zero elements that will be present in the PC sequence S that is output from the encoder 400.

For example, a single bit (or a group of bits) of binary data modulated by modulator function 420 may be represented by two data elements (M=2). In some embodiments, data mapped to different elements may be modulated with different constellation maps to maximize the diversity of the constellation points mapped to the same input bits. As an example, the sub-constellation maps may be generated from multi-dimensional modulation.

A second level of spreading is implemented by the spreader function 430. The spreader function 430 further spreads the length M modulated data sequence to a longer sequence by mapping the data sequence of length M to a PC sequence S of length $N_{sc}$. M is equal to the number of non-zero elements and $N_{sc}$ is greater than M. The M non-zero elements are mapped to the longer PC sequence S according to a predefined sequence pattern (i.e. one of the sequence patterns defined in sequence data 230 or 330) with a sparse or low density of non-zero elements. In one embodiment, the mapping is done such that the non-zero elements in a particular PC sequence will collide with less than M non-zero elements (for example no more than 1 where M=2) from each of the other PC sequences, as described above. In one embodiment, mapping the modulated data stream onto one of the plurality of spreading sequences consists of multiplying the modulated data stream output from modulator function 420 with the spreading sequence pattern at spreader function 430.

In example embodiments where a device 102 has more than a single assigned sequence pattern stored in its sequence data 230, the sequence patterns may be randomly selected or may be used sequentially or in accordance with some other defined order.

In another embodiment, mapping the modulated data stream consists of non-linear mapping such as the multi-dimension modulation employed in Sparse Code Multiple Access (SCMA) systems in which a code book function that defines sequence patterns with modulated non-zero elements is used instead of separate modulator and spreader functions 420 and 430.

In a further embodiment, for a spreading sequence, there may be one dual spreading sequence being used. The dual spreading sequence and the paired sequence are orthogonal to each other but may partially collide with other sequences. In one example, if there is a first sequence with a value of +1 at subcarrier-a and a value of +1 at subcarrier-b, then a second sequence with a value of +1 at subcarrier-a and a value of −1 at subcarrier-b is the dual orthogonal sequence to the first sequence. In other words, in a dual sequence modulation and spreading scheme in which M=2, a first sequence has a first value at a first subcarrier and a second value at a second subcarrier, and a second sequence also has a third value at the first subcarrier and a fourth value at the second subcarrier, and the vector made of first and second values is orthogonal to the vector made of third and fourth values. Accordingly, the orthogonality of the modulated symbols between the two PC sequences avoids a full collision occurring at all their respective non-zero elements. Thus, the possible sequences may include a first set of partial collision sequences and a second set of partial collision sequences. However, each sequence in the second set is orthogonal to one sequence in the first set, which permits a full collision to be avoided. The use of such dual spreading sequences may at least double the number of possible PC sequences within a PCES group and thus enable a network node 104 to support unscheduled transmissions for additional user devices 102. In one embodiment, a sequence with K non-zero elements has K−1 orthogonal dual sequences.

Once data has been encoded by encoder module 400, the resulting data encoded PC sequence is then transmitted through a wireless medium (wireless network 112) by a transmit module 440 which may implement additional functions such as pulse shaping and subcarrier modulation. The encoded and spread data sequence may be transmitted according to any protocol which allows multiple devices and data streams to share wireless communications resources in a network such as, but not limited to, multiple-input-multiple-output (MIMO) spatial layers, Orthogonal Frequency-Division Multiplexing (OFDM) tones, time division multiple access (TDMA) layers etc.

The encoder 400 thus provides a spreading/diversity gain and reduces the likelihood of collision between transmissions. Although shown as separate functions, it will be appreciated that the two level modulator and spreader functions 420, 430 may be implemented as one component in hardware, or in software, or in a combination thereof. The functions 420, 430 may be executed by the processor systems 202, 302 in the device 102 or network node 104.

Figure 5A:
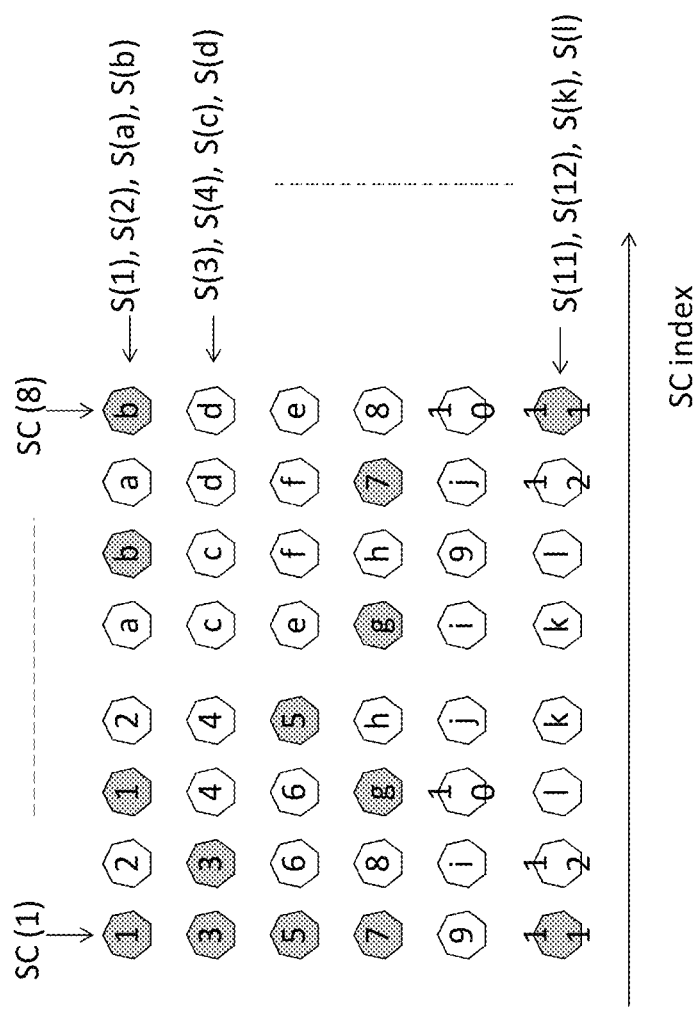
FIG. 5A is a diagram illustrating a first sample set of partial collision sequences in accordance with one implementation of the present disclosure.

FIG. 5A illustrates a first set or pattern of partial collision (PC) sequences S which may be used by devices 102 and node 104 in the network 100 in accordance with one embodiment of the present disclosure. The length of each PC sequence S is $N_{sc}$, which corresponds to the number of wireless resource elements. In the example shown, $N_{sc}$ corresponds to eight (8) subcarriers (SC) as indicated by the columns SC(1) . . . SC(8) of heptagons along the axis labelled "SC Index". The number of non-zero data elements, M, in each of the PC sequences S is two and the number of zero data elements is 6. For illustration purposes in FIG. 5A, 24 PC sequences S are shown, indexed as S(x), where 1<=x<=12, and a<=x<=l. The sequences S(x) are arranged in 6 rows, with 4 superimposed sequences represented per row—sequences s(1), s(2), s(a) and s(b) are represented in the top row, sequences s(3), s(4), s(c) and s(d) are represented in the next row, and so on with sequences s(11), s(12), s(k) and (sl) represented in the bottom (sixth) row. In each row, each heptagon representing a subcarrier is labelled with the index (1<=x<=12; and a<=x<=l) of the sequence S(x) for which the subcarrier has a non-zero element. For example, in the first row representing sequences s(1), S(2), s(a) and s(b), the sequence pattern for sequence S(1) is {10100000} where the "1"s represent non-zero elements and "0"s represent zero elements, such that the sequence S(1) is represented in the top row by labelling the first and third heptagons that correspond to subcarriers SC(1) and SC(3) with a "1" to indicate the location of the two non-zero elements in sequence S(1). The zero or benign resource elements for sequence SC(1) are not expressly labelled, but rather are labelled with the indexes of the sequences for which they are non-zero elements. Thus, sequence S(2) having a sequence pattern of {0 2 0 2 0 0 0 0} (where 2 represents non zero elements) is represented in the top row by labelling the second and fourth heptagons that correspond to subcarriers SC(2) and SC(4) with a "2" to indicate the location of the two non-zero elements in sequence S(2). Similarly, for sequence S(a), the fifth and seventh heptagons that correspond to subcarriers SC(5) and SC(7) are labelled with "a" to indicate the location of the two non-zero elements in sequence S(a). Accordingly, the heptagon labels "1", "2", "a", or "b", represents the position of the non-zero data elements for the corresponding PC sequences indexed by the same label. The grey shaded heptagons shown in FIG. 5A are referenced below to illustrate an example.

As can be seen in FIG. 5A, if all 24 PC sequences were transmitted simultaneously from different transmitters in an overlapping coverage area, carrier level collisions would across all 8 subcarriers. However, as a result of the design of the sequence patterns, none of the non-zero elements for any single sequence S(x) would collide with all of the non-zero elements for any other single sequence S(z). Rather all collisions at the sequence level would be partial collisions at most, not full collisions. For example, sequence S(1) has non-zero elements modulated onto subcarriers SC(1) and SC(3). Partial sequence collisions can occur in that the non-zero data element of sequence S(1) modulated onto subcarrier SC(1) may collide with the non-zero elements of each of sequences S(3), S(5), S(7), S(9) and S(11), which also have non-zero elements modulated into subcarrier SC(1) and the data element of sequence S(1) modulated onto subcarrier SC(3) may collide with the non-zero elements of each of sequences S(4), S(6), S(g), S(10) and S(l). However, no full sequence collisions can occur in which all of the non-zero elements of sequence S(1) collide with non-zero elements of any single one of the sequences S(3), S(5), S(7), S(9) and S(11) S(4), S(6), S(g), S(10) and S(l).

With $N_{sc}$ corresponding to the number of resource elements or subcarriers SC(y) (1<=y<=$N_{sc}$), and with 2 non-zero elements (M=2) in each sequence, the total number N of partial collision sequences S(x) (1<=x<=N) which may be achieved may be represented as:

$$\binom{N_{SC}}{2} = \frac{N_{SC}(N_{SC}-1)}{2}$$

$$N \propto N_{SC}^2$$

Thus, in the example shown in FIG. 5A, for two non-zero data elements (M=2) and eight subcarriers ($N_{sc}$=8), up to 28 different data PC sequences may be generated. It can be seen that the first and third subcarriers SC(1) and SC(3) for sequence S(1) are non-zero and these may collide with only one element from each of the sequences S(3), S(5), S(7), S(9), S(11) and (S)4, S(6), S(g), S(10) and S(l). For sequences with K non-zero elements, the total number of partial-collision sequences is $$\binom{N}{K}.$$

If companion orthogonal spreading sequences are used, as described above, the total number of partial-collision sequences is $$K \times \binom{N}{K}.$$

FIG. 5B illustrates a second pattern of partial collision sequences which may be used by devices 102 in the network 100 in accordance with example embodiments. In this embodiment, some sequences S may have non-zero elements on all the subcarriers that have non-zero elements in another particular sequence, while only partially colliding with non-zero elements in other sequences. The sequences have a different spreading factor and a longer sequence may collide with other shorter sequences at more than one resource element. For example, in FIG. 5(b) the sequence labelled S(1) has M=8 and has non-zero elements on all subcarriers SC(1) to SC(8) and the sequences labelled S(2) through S(11) each have M<8. The sequences S(2) to S(11) are each selected such that no single sequence within the group of S(2) to s(11) has all non-zero elements on the same set of subcarriers as any other single one of the sequences in the group S(2) to S(11). However, all of the non-zero elements of sequences S(2) to S(11) are located on a subcarrier that has a non-zero element in sequence S(1)—accordingly, in the frequency domain, all non-zero elements in each of sequences S(1) to s(11) could potentially collide with non-zero elements in sequence S(1).

Accordingly, in the embodiment of FIG. 5b, the PC sequences S are designed so that the set of sequences has a smallest maximum resource element collision in the frequency domain. The partial collision properties of the sequences may be achieved using sequence values that correspond to partially offset pulses in the time domain. For example, in one embodiment, a rotated Fast Fourier Transform (R-FFT) is defined as follows. Let $W_M^{(i)}$ be the ith M×M R-FFT matrix, with:

$$w_{k,n}^{(i)} = \exp\left(j2\pi k\left(\frac{n}{M} + \frac{i}{N}\right)\right),$$

where 0≤i≤N/M−1 is the rotation index. An example with two non-zero elements, for four sequences, (M=2, N=4, and i=0), results in the conventional FFT matrix:

$$W_2^{(0)} = \begin{bmatrix} 1 & 1 \\ 1 & -1 \end{bmatrix}.$$

However, with i=1, the following rotated matrix is obtained:

$$W_2^{(1)} = \begin{bmatrix} 1 & 1 \\ j & -j \end{bmatrix}.$$

Each column represents a sequence. By applying the sequences to the $2^{nd}$ and $4^{th}$ element of a low density sequence with a length of four resource elements ($N_{sc}$=4) the following values are obtained:

$$\begin{matrix} 0 & 1 & 0 & 1 \\ 0 & 1 & 0 & -1 \\ 0 & 1 & 0 & j \\ 0 & 1 & 0 & -j \end{matrix}.$$

For a set of eight sequences, M=2 and N=8 results in:

$$W_2^{(0)} = \begin{bmatrix} 1 & 1 \\ 1 & -1 \end{bmatrix}$$

$$W_2^{(1)} = \begin{bmatrix} 1 & 1 \\ \sqrt{2}/2 + j\sqrt{2}/2 & -(\sqrt{2}/2 + j\sqrt{2}/2) \end{bmatrix}$$

$$W_2^{(2)} = \begin{bmatrix} 1 & 1 \\ j & -j \end{bmatrix}$$

$$W_2^{(3)} = \begin{bmatrix} 1 & 1 \\ -\sqrt{2}/2 + j\sqrt{2}/2 & \sqrt{2}/2 - j\sqrt{2}/2 \end{bmatrix}$$

Using the $2^{nd}$ and $4^{th}$ elements again for example, the corresponding length-4 low density sequences are:

$$\begin{array}{cccl}
0 & 1 & 0 & 1 \\
0 & 1 & 0 & -1 \\
0 & 1 & 0 & j \\
0 & 1 & 0 & -j \\
0 & 1 & 0 & \sqrt{2}/2 + j\sqrt{2}/2 \\
0 & 1 & 0 & -\sqrt{2}/2 - j\sqrt{2}/2 \\
0 & 1 & 0 & -\sqrt{2}/2 + j\sqrt{2}/2 \\
0 & 1 & 0 & \sqrt{2}/2 - j\sqrt{2}/2
\end{array}$$

Thus, although eight sequences listed above all have potential collisions on all non-zero elements that share common sub-carriers, the sequences only partially collide due to the values of the sequences and partially offset pulses in the time domain.

Accordingly, it will be appreciated that collisions can occur at the sequence level and at the resource element level. A complete collision of all of the resource elements between two sequences results in a complete sequence collision. However, according to example embodiments, PCES groups are designed to avoid complete sequence collisions and to allow successful decoding when partial sequence collisions occur. PCES groups are designed to avoid complete sequence collisions through one or more of the following: (a) the PC sequences are defined to maximize the number of PC sequences that each have a unique subset of subcarriers designated for non-zero elements relative to other PC sequences within the PCES group; and (b) in the case where multiple PC sequences have the same subset of subcarriers designated for non-zero elements, complete collisions at the subcarrier level are avoided by one or both of: (i) defining a partial pulse offset in the time domain sufficient to permit the decoder to differentiate between the subcarriers of different PC sequences; and (ii) using orthogonal modulation between the common subcarriers of different PC sequences to permit the decoder to differentiate between the subcarriers of different PC sequences. In example embodiments, the sequence patterns stored at devices 102 and node 104 define the resource element information required to output such PC sequences, including what subcarriers SC are non-zero elements, what, if any, time domain offsets are to be applied to the subcarriers, and what, if any, subcarriers are to be orthogonally modulated relative to each other. In example embodiments, data transmitted by a user device 102 in accordance with the PCMA transmission scheme may be received and decoded by decoder module 450 of the network node 104. The network node 104 may receive multiple data transmissions from different devices 102, each of which is transmitting data according to its assigned PC sequence S (or sequences). In the example shown in FIG. 5A, at one snapshot in time, user devices 102 associated with the sequences highlighted in grey, namely sequences S(1), S(b), S(3), S(5), S(7), S(g), and S(11), may transmit data. With the PCMA transmission scheme, if the network load is light or moderate, the received data may be decoded by decoder 450 using a successive interference cancellation (SIC) decoding. If the network load is high, other decoding schemes such as a message passing algorithm (MPA) may be used. Accordingly in some example embodiments the node 104 receiving the sequences tracks network load and switches from SIC decoding to MPA decoding if it determines that the number of active sequences S at a given time exceeds a threshold.

It will be appreciated from FIG. 5A, for example, that the receiver decoder 450 of the network node 104 may first decode the fourth data element (on subcarrier SC(4)) of the signal associated with sequence S(5) since, in this example, no other data elements are transmitted on this subcarrier SC(4). Decoder may then decode the fifth element (on subcarrier SC(5)) of sequence S(g), and then the third element (on subcarrier SC(3)) of sequence S(g). Then, the third element (on subcarrier SC(3) in sequence S(1) may be decoded since the colliding element in sequence S(g) has been determined. It will be appreciated that other factors such as, but not limited to, received power may be used to determine the SIC decoding order.

In some embodiments, the network node 104 may apply a combination of maximum likelihood (ML) and SIC decoding in order to receive and decode the PC data sequences S. In the example illustrated in FIG. 5A, an ML decoder may incorporated into decoder module 450 and be used to decode the third element (on carrier SC(3)) of sequence S(g) which collides with the third element (on carrier SC(3)) of sequence S(1). That result may be combined with the result for the fifth element (on carrier SC(5)) of sequence S(g) (which is collision free) to improve the decoder's capability. A similar approach may be used to detect sequence S(b). Thus, ML decoding may be applied to the signals having the least collisions with other user signals. With the use of SIC and the interlaced structure that results from the PC sequence design, each successful detection of one sequence signal element simplifies the detection of the other undetected sequence signal elements.

Figure 6:
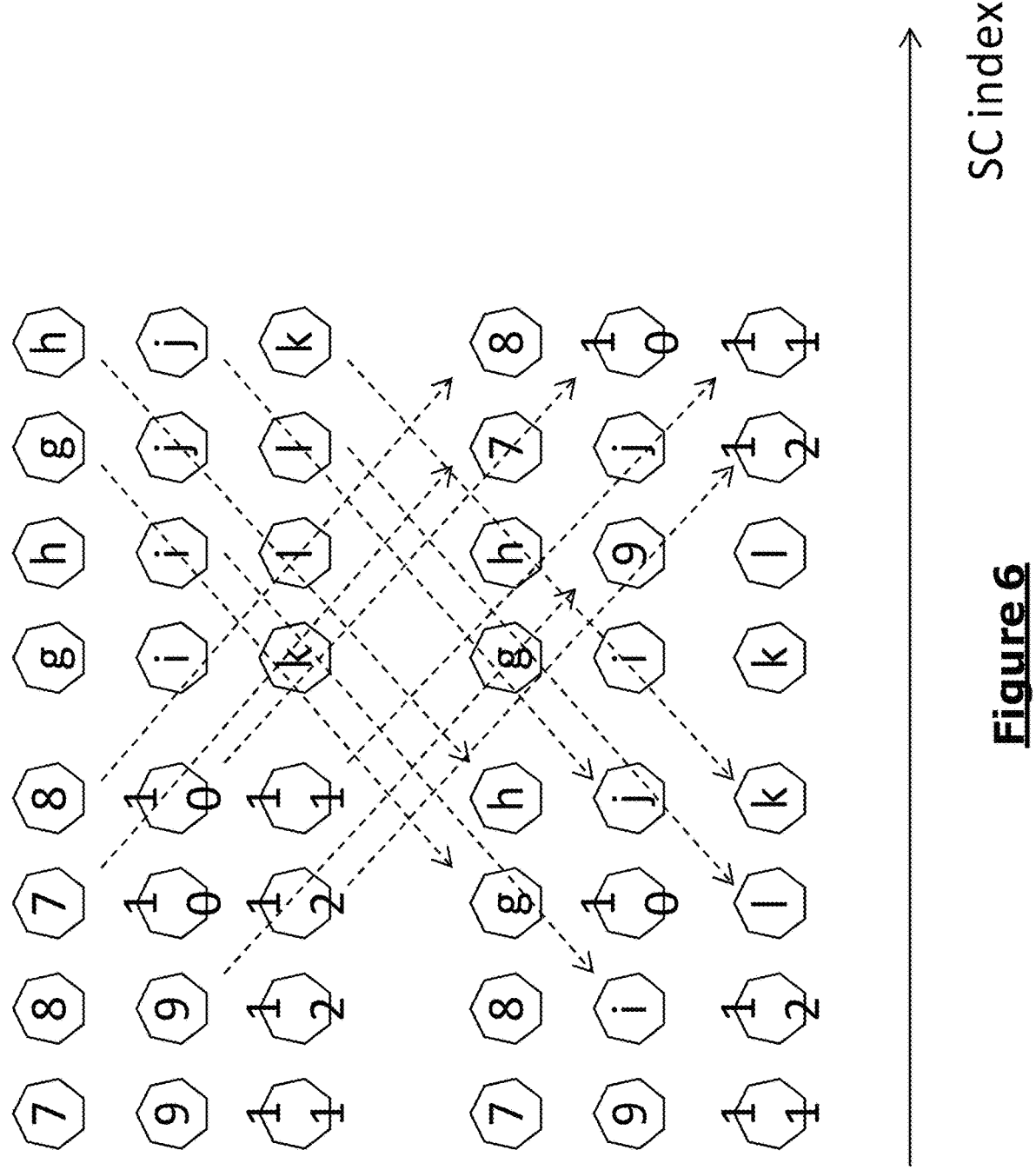
FIG. 6 is a diagram illustrating a method of generating additional partial collision sequences.
Figure 7:
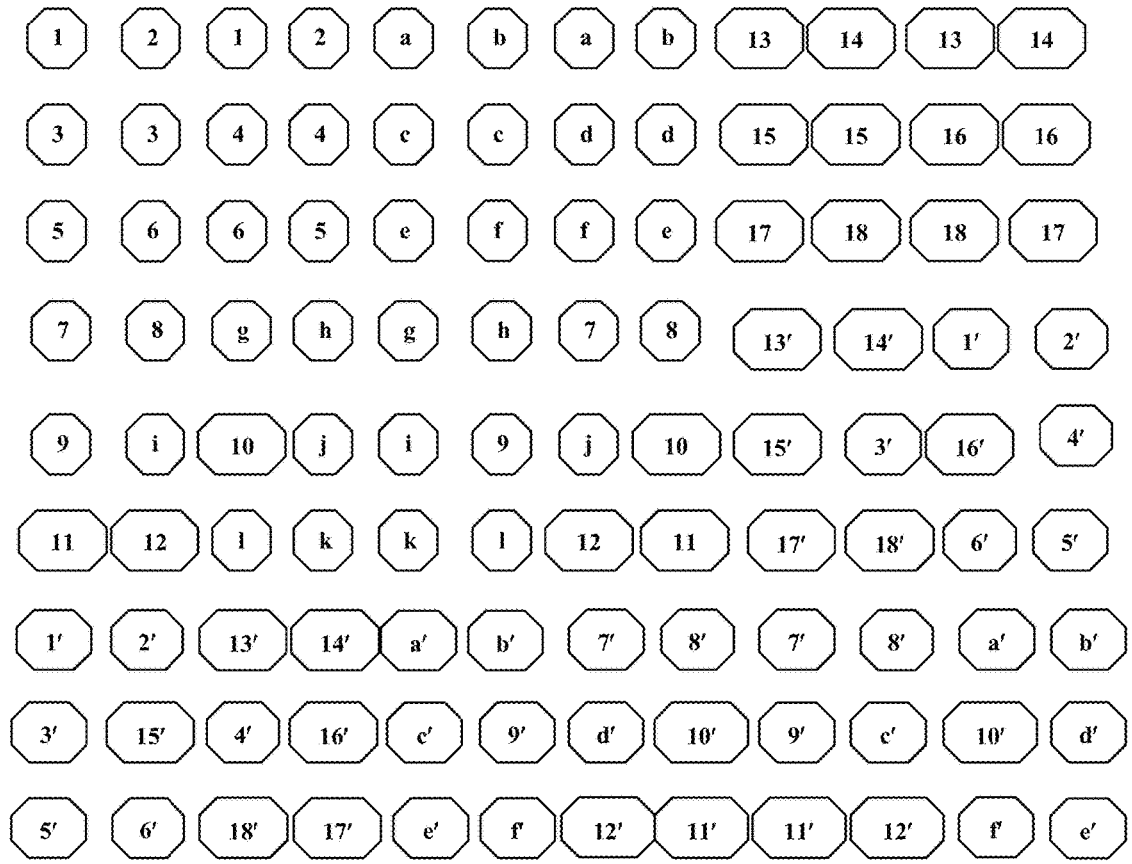
FIG. 7 is a diagram illustrating a second sample set of partial collision sequences in accordance with one implementation of the present disclosure.
Figure 8:
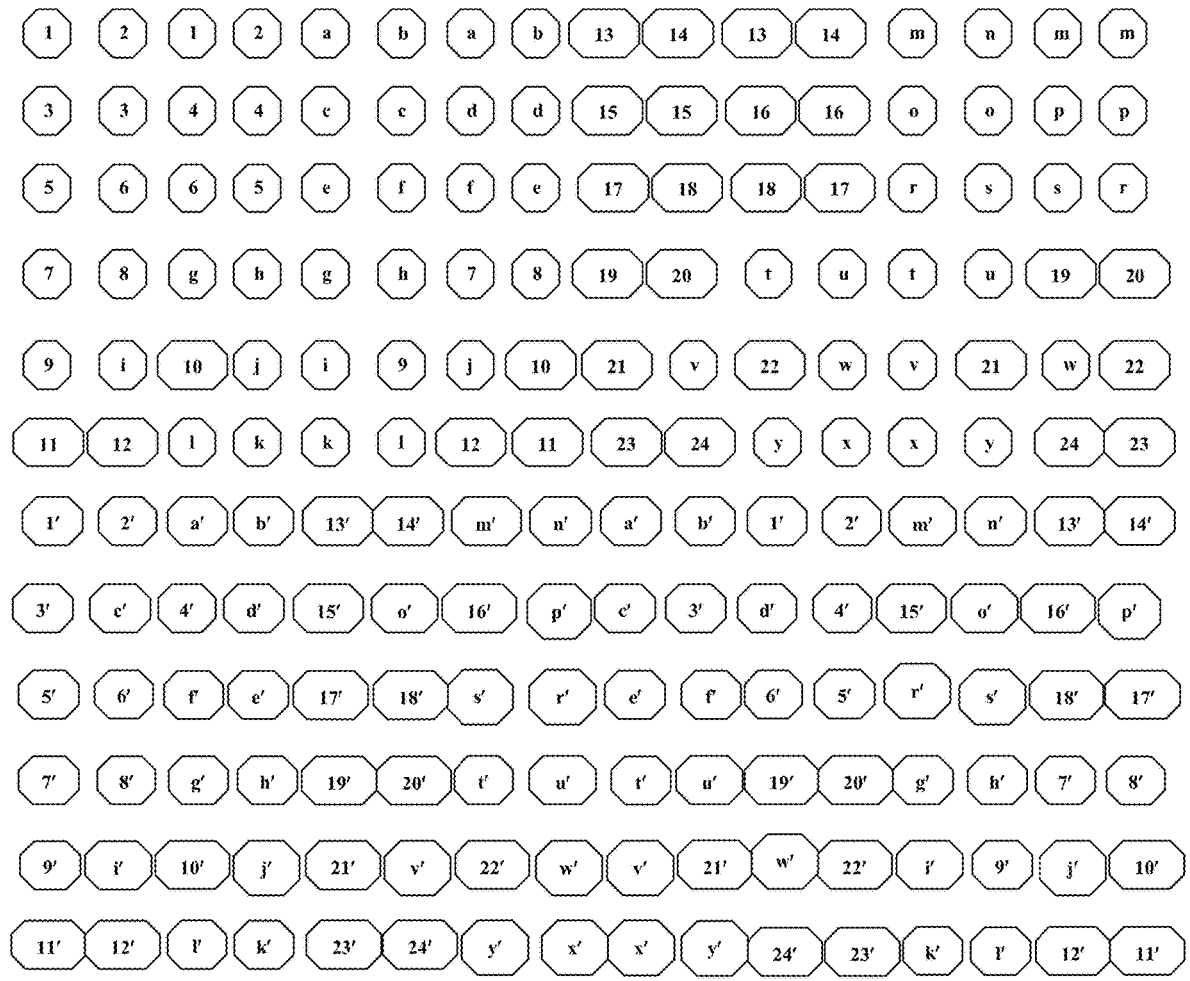
FIG. 8 is a diagram illustrating a third sample set of partial collision sequences in accordance with one implementation of the present disclosure.

In one embodiment, as illustrated in FIG. 6, additional sequences S(x) may be generated based on the sequences illustrated in FIG. 5A by swapping the second non-zero elements between two blocks of four subcarriers. Additional sequences may be generated from any of the combinations between these blocks. FIGS. 7 and 8 provide additional sample sets of partial collision sequences for $N_{sc}=12$ and 16, respectively with M=2 in both examples. The larger or varying sizes of heptagon and octagon symbols in the Figures do not have any significance and are used merely to accommodate the sequence label.

With the longer partial collision sequences, a device 102 is thus less restricted in accessing resources and may transmit data over a wider resource, providing for higher flexibility and a more balanced load in the network 100. Improved interference diversity also may be achieved with a larger number of partial collision sequences and interference being distributed to different user devices 102.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of transmitting data at a transmitter device, comprising:
   determining a sequence pattern from a group of sequence patterns, wherein the group of sequence patterns comprise a first, second, third, and fourth sequence pattern, and each of the four sequence patterns comprises at least two non-zero elements indicating resource elements associated with the corresponding sequence pattern;
   wherein a first specific non-zero element of the first sequence pattern indicates a first resource element of a first resource element block, and a second specific non-zero element of the first sequence pattern indicates a second resource element of the first resource element block; wherein a first specific non-zero element of the second sequence pattern indicates a first resource element of a second resource element block, and a second specific non-zero element of the second sequence pattern indicates a second resource element of the second resource element block;
   wherein the first resource elements of the first and second resource element blocks have a same resource element position in each of the first and second resource element blocks, and the second resource elements of the first and second resource element blocks have a same resource element position in each of the first and second resource element blocks;
   wherein a first specific non-zero element of the third sequence pattern indicates the first resource element of the first resource element block, and a second specific non-zero element of the third sequence pattern indicates the second resource element of the second resource element block;
   wherein a first specific non-zero element of the fourth sequence pattern indicates the second resource element of the first resource element block, and a second specific non-zero element of the fourth sequence pattern indicates the first resource element of the second resource element block;
   mapping the data to the at least two resource elements indicated by the two non-zero elements of the determined sequence pattern; and
   sending the mapped data.

2. The method of claim 1 wherein each of the resource elements associated with the corresponding sequence pattern includes a subcarrier.

3. The method of claim 1 wherein the first resource element block includes 4 resource elements, and the second resource element block includes 4 resource elements.

4. The method of claim 1 wherein the first resource element block includes 8 resource elements, and the second resource element block includes 8 resource elements.

5. The method of claim 1 wherein the number of resource elements of the first resource element block is identical to the number of resource elements of the second resource block.

6. The method of claim 1 wherein mapping the data comprises modulating the data onto the at least two resource elements indicated by the two non-zero elements of the determined sequence pattern.

7. The method of claim 6 wherein modulating the data is performed by using one or more Quadrature Amplitude Modulation (QAM) constellations or using multi-dimensional modulation.

8. A transmitter device configured to operate in a wireless network, the transmitter device comprising:
   a wireless communications interface;
   a processor; and
   one or more non-transitory computer readable media storing computer readable instructions configured to cause the transmitter device to:
      determine a sequence pattern from a group of sequence patterns, wherein the group of sequence patterns comprise a first, second, third, and fourth sequence pattern, and each of the four sequence patterns comprises at least two non-zero elements indicating resource elements associated with the corresponding sequence pattern;
      wherein a first specific non-zero element of the first sequence pattern indicates a first resource element of a first resource element block, and a second specific non-zero element of the first sequence pattern indicates a second resource element of the first resource element block; wherein a first specific non-zero element of the second sequence pattern indicates a first resource element of a second resource element block, and a second specific non-zero element of the second sequence pattern indicates a second resource element of the second resource element block;
      wherein the first resource elements of the first and second resource element blocks have a same resource element position in each of the first and second resource element blocks, and the second resource elements of the first and second resource element blocks have a same resource element position in each of the first and second resource element blocks;
      wherein a first specific non-zero element of the third sequence pattern indicates the first resource element of the first resource element block, and a second specific non-zero element of the third sequence pattern indicates the second resource element of the second resource element block;
      wherein a first specific non-zero element of the fourth sequence pattern indicates the second resource element of the first resource element block, and a second specific non-zero element of the fourth sequence pattern indicates the first resource element of the second resource element block;
   map the data to the at least two resource elements indicated by the two non-zero elements of the determined sequence pattern; and
   send the mapped data.

9. The transmitter device of claim 8 wherein each of the resource elements associated with the corresponding sequence pattern includes a subcarrier.

10. The transmitter device of claim 8 wherein the first resource element block includes 4 resource elements, and the second resource element block includes 4 resource elements.

11. The transmitter device of claim 8 wherein the first resource element block includes 8 resource elements, and the second resource element block includes 8 resource elements.

12. The transmitter device of claim 8 wherein the number of resource elements of the first resource element block is identical to the number of resource elements of the second resource block.

13. The transmitter device of claim 8 wherein the instructions are further configured to cause the transmitter device to:
   modulate the data onto the at least two resource elements indicated by the two non-zero elements of the determined sequence pattern.

14. The transmitter device of claim 13 wherein the instructions are further configured to cause the transmitter device to:
   use one or more Quadrature Amplitude Modulation (QAM) constellations or use multi-dimensional modulation to modulate the data onto the at least two resource elements.

15. A non-transitory computer readable storage medium storing a program causing a computer to execute a process, the process comprising:
   determining a sequence pattern from a group of sequence patterns, wherein the group of sequence patterns comprise a first, second, third, and fourth sequence pattern, and each of the four sequence patterns comprises at least two non-zero elements indicating resource elements associated with the corresponding sequence pattern;
      wherein a first specific non-zero element of the first sequence pattern indicates a first resource element of a first resource element block, and a second specific non-zero element of the first sequence pattern indicates a second resource element of the first resource element block; wherein a first specific non-zero element of the second sequence pattern indicates a first resource element of a second resource element block, and a second specific non-zero element of the second sequence pattern indicates a second resource element of the second resource element block;
      wherein the first resource elements of the first and second resource element blocks have a same resource element position in each of the first and second resource element blocks, and the second resource elements of the first and second resource element blocks have a same resource element position in each of the first and second resource element blocks;
      wherein a first specific non-zero element of the third sequence pattern indicates the first resource element of the first resource element block, and a second specific non-zero element of the third sequence pattern indicates the second resource element of the second resource element block;
      wherein a first specific non-zero element of the fourth sequence pattern indicates the second resource element of the first resource element block, and a second specific non-zero element of the fourth sequence pattern indicates the first resource element of the second resource element block;
   mapping the data to the at least two resource elements indicated by the two non-zero elements of the determined sequence pattern; and
   sending the mapped data.

16. The medium of claim 15 wherein each of the resource elements associated with the corresponding sequence pattern includes a subcarrier.

17. The medium of claim 15 wherein the first resource element block includes 4 resource elements, and the second resource element block includes 4 resource elements.

18. The medium of claim 15 wherein the first resource element block includes 8 resource elements, and the second resource element block includes 8 resource elements.

19. The medium of claim 15 wherein the number of resource elements of the first resource element block is identical to the number of resource elements of the second resource block.

20. The medium of claim 15 wherein mapping the data comprises modulating the data onto the at least two resource elements indicated by the two non-zero elements of the determined sequence pattern.

* * * * *